(12) United States Patent
Gregori et al.

(10) Patent No.: US 11,341,273 B2
(45) Date of Patent: May 24, 2022

(54) METHOD FOR COMBINING DIFFERENT PARTIAL DATA

(71) Applicant: mediri GmbH, Heidelberg (DE)

(72) Inventors: Johannes Gregori, Heidelberg (DE); Sigurd Randoll, Heidelberg (DE); Stefan Hoffmann, Heidelberg (DE); Matthias Günther, Heidelberg (DE)

(73) Assignee: mediri GmbH, Heidelberg (DE)

( * ) Notice: Subject to any disclaimer, the term of this patent is extended or adjusted under 35 U.S.C. 154(b) by 29 days.

(21) Appl. No.: 17/051,118

(22) PCT Filed: Apr. 26, 2019

(86) PCT No.: PCT/DE2019/200034
§ 371 (c)(1),
(2) Date: Oct. 27, 2020

(87) PCT Pub. No.: WO2019/206384
PCT Pub. Date: Oct. 31, 2019

(65) Prior Publication Data
US 2021/0049301 A1    Feb. 18, 2021

(30) Foreign Application Priority Data

Apr. 27, 2018 (DE) ...................... 10 2018 206 616.7

(51) Int. Cl.
*H04L 29/06* (2006.01)
*G06F 21/62* (2013.01)

(52) U.S. Cl.
CPC ...... *G06F 21/6254* (2013.01); *H04L 63/0442* (2013.01); *H04L 63/0823* (2013.01); *H04L 63/166* (2013.01)

(58) Field of Classification Search
CPC ......... G06F 21/6254; G06F 2221/2137; G06F 21/16; G06F 21/31; H04L 63/0442;
(Continued)

(56) References Cited

U.S. PATENT DOCUMENTS

| 5,956,400 A * | 9/1999 | Chaum | H04L 29/06 |
| | | | 713/167 |
| 2011/0110568 A1 * | 5/2011 | Vesper | G06Q 10/10 |
| | | | 382/128 |

(Continued)

FOREIGN PATENT DOCUMENTS

| AT | 12 796 U1 | 11/2012 | |
| EP | 3 046 044 A1 | 7/2016 | |
| EP | 3156932 A1 * | 4/2017 | ......... G06F 21/6245 |

OTHER PUBLICATIONS

Vasilomanolakis et al., "On the Security and Privacy of Internet of Things Architectures and Systems", 2015 International Workshop on Secure Internet of Things (SIoT), Date of Conference: Sep. 21-25, 2015.*

(Continued)

*Primary Examiner* — Morshed Mehedi
(74) *Attorney, Agent, or Firm* — Seed Intellectual Property Law Group LLP

(57) ABSTRACT

A method for combining different partial data includes providing a secure connection between a connection unit in a first network and an analysis unit a second network, separating original data into at least two items of partial data comprised of analysis data and personal data as first and second partial data that can be assigned to each other by way of assigning information, pseudonymizing the second partial data, transmitting the first partial data and pseudonymized second partial data and the assigning information to the analysis unit, storing the second partial data on the connection unit, providing third partial data on the analysis unit in the form of analyzed first partial data, transmitting the third partial data and the pseudonymized second partial data with the assigning information to the connection unit via the secure connection, and combining the third partial data and the second partial data using the assigning information.

25 Claims, 2 Drawing Sheets

(58) Field of Classification Search
CPC .............. H04L 63/0823; H04L 63/166; H04L 63/0281; H04L 63/0435; H04L 2463/062
See application file for complete search history.

(56) References Cited

U.S. PATENT DOCUMENTS

| | | | |
|---|---|---|---|
| 2014/0236628 A1* | 8/2014 | Friese | G16Z 99/00 705/3 |
| 2014/0275807 A1* | 9/2014 | Redei | G16H 40/63 600/300 |
| 2017/0053069 A1* | 2/2017 | Walter | G16H 10/60 |

OTHER PUBLICATIONS

International Search Report for Application No. PCT/DE2019/200034, dated Aug. 2, 2019, 17 pages.
Ruef, v M., "Kryptoanalyse Von Session IDs", with English Machine Translation, https://www.scip.ch/?labs.20101013, Oct. 13, 2010, 9 pages.
PHP: rfc:session-create-id, https://wiki.php.net/rfc/session-create-id, dated Apr. 7, 2016, 4 pages.
Appl, C. et al., "Big Data, Innovation und Datenschutz", with English Machine Translation of sections 5.3, 5.3.1, and 5.5.3, Dec. 2017, 136 pages.
International Preliminary Report on Patentability for Application No. PCT/DE2019/200034, dated Oct. 27, 2020.

* cited by examiner

METHOD FOR COMBINING DIFFERENT PARTIAL DATA

BACKGROUND

Technical Field

The present disclosure relates to a method for merging different partial data, in particular in the form of evaluation data and personal data, as first and second partial data, which are stored in different networks, wherein the different partial data are assignable to one another by way of assignment information.

The disclosure further relates to a connection unit for handling data.

The disclosure further relates to a method for handling data on a connection unit.

The disclosure further relates to an evaluation unit for carrying out a method for handling data.

The disclosure further relates to a client unit for carrying out a method for handling data.

The disclosure further relates to a system for merging different partial data, in particular in the form of evaluation data and personal data, as partial data which are stored in different networks, wherein the different partial data are assignable to one another by way of assignment information.

The disclosure further relates to a computer-readable medium for storing instructions for carrying out a method for merging different partial data on a data processor.

The disclosure further relates to a computer-readable medium for storing instructions for carrying out a method for handling data on a data processor.

Although the present disclosure is generally applicable to any data, the present disclosure is explained with respect to data in the form of a person's personal image data.

Although the present disclosure is generally applicable to any person, the present disclosure is explained in relation to persons in the form of patients.

Although the present disclosure is generally applicable in any field, the present disclosure is explained in relation to the field of medicine.

Description of the Related Art

Personal data, in particular patient data, require a high level of data protection to protect against misuse. Such data are only intended to be accessible to a restricted user group or available, based on networks, only in an access-restricted network such as a local network of a clinic or a practice, in order to avoid uncontrolled distribution or uncontrolled access "from the outside."

In order to increase the quality of diagnoses, it has become known to be able to evaluate corresponding data, for example examination data such as image data or the like, not only locally in the clinic or in a practice, but rather by external service providers specialized in doing so. In order to ensure the confidentiality of the patient-related data, personal data can be completely or partially replaced by an identification or assignment number from the data to be evaluated before the transmission of the data to be evaluated to the external service provider. The data to be evaluated are then sent together with the identification number to the external service provider for evaluation. The identification number is maintained in a list within the practice or the clinic and includes the assignment of the identification number to the personal data of the respective patient.

If the external service provider then transmits the evaluated data back to the clinic or practice, the evaluated data are then made available to a physician, for example.

One of the disadvantages associated with this is that the manual allocation results in a high susceptibility to errors in the assignment of the evaluated data to the respective patient. A further disadvantage is the high outlay, both in terms of time and in terms of personnel, because the identification of personal data, for example in image data of the patient, requires a "graphic" deletion of the patient data in the image itself, which in turn increases the susceptibility to error: If the patient data or, generally, the personal data are not completely deleted from the image data, an assignment of the image data to patient information by the external service provider is possible at least in part. Data protection is reduced considerably.

DE 10 2013 211 540 A1 discloses a device, a method and a product for the transfer of security-critical medical data records via a public network. In order to be able to transmit security-critical data sections in pseudonymized form, a pseudonymization function is adaptively applied to the data sets. The pseudonymization function is in each case dynamically calculated as a function of a read-in processing context, which takes into account the planned user role, the planned purpose of the data processing and an application context. The disadvantage here is the high outlay and the complicated implementation.

Therefore, the present disclosure provides a method, a system, and units of the system, which enable a flexible and at the same time reliable evaluation of data by external service providers. The present disclosure also enables a simple, cost-effective, and secure implementation, in particular in practices or clinics.

BRIEF SUMMARY

In at least one embodiment, the disclosure provides a method for merging different partial data, in particular in the form of evaluation data and personal data as first and second partial data, comprising the steps of:

providing a secure connection between a connection unit in a first network and an evaluation unit in a second network, separating original data into at least two partial data, wherein the different partial data are assignable to one another by way of assignment information, pseudonymizing the second partial data by way of a pseudonymization unit, transmitting first partial data and the pseudonymized second partial data and the assignment information from the connection unit to the evaluation unit, storing the second partial data on the connection unit, providing third partial data on the evaluation unit on the basis of the first partial data, in particular wherein the third partial data are provided in the form of evaluated first partial data, transmitting the third partial data and the pseudonymized second partial data together with the assignment information to the connection unit via the secure connection by the evaluation unit, and merging the third partial data and the second partial data on the basis of the assignment information.

In an additional embodiment, the disclosure provides a connection unit for handling data when carrying out a method as described herein, designed to carry out the steps of:
  providing a secure connection to an evaluation unit in a second network,
  transmitting first partial data and pseudonymized second partial data to the evaluation unit,
  storing the second partial data on the connection unit,
  receiving third partial data and the pseudonymized second partial data together with the assignment information regarding the secure connection from the evaluation unit, and in particular
  merging the third partial data and the second partial data on the basis of the assignment information.

In an additional embodiment, the disclosure provides a method for handling data on a connection unit as described herein, comprising the steps of:
  providing a secure connection to an evaluation unit in a second network,
  transmitting first partial data and pseudonymized second partial data to the evaluation unit,
  storing the second partial data on the connection unit,
  receiving third partial data and the pseudonymized second partial data together with the assignment information regarding the secure connection from the evaluation unit, and in particular merging the third partial data and the second partial data on the basis of the assignment information.

In an additional embodiment, the disclosure provides an evaluation unit for carrying out a method as described herein, designed to carry out the steps of:
  providing a secure connection to a connection unit in a first network,
  receiving first partial data and pseudonymized second partial data together with the assignment information from the connection unit,
  providing third partial data based on the first partial data, in particular wherein the third partial data are provided in the form of evaluated first partial data, and
  transmitting the third partial data and the pseudonymized second partial data together with the assignment information to the connection unit via the secure connection.

In an additional embodiment, the disclosure provides a client unit for performing with a method as described herein, designed to request, in particular in merged form, third and second partial data from the connection unit via a second secure connection to the connection unit on the basis of first and second partial data, in such a manner that the second partial data associated with the third partial data are transmitted from the connection unit via the evaluation unit to the client unit, wherein, preferably, the client unit merges the third and second partial data.

In an additional embodiment, the disclosure provides a system for merging different partial data, in particular in the form of evaluation data and personal data as partial data, which are stored in different networks, wherein the different partial data are assignable to one another by way of assignment information, comprising at least one connection unit as described herein in a first network and an evaluation unit as described herein in a second network.

In an additional embodiment, the disclosure provides a computer-readable medium for storing instructions for performing a method according to any of the claims 1-18 on a data processor.

In an additional embodiment, the disclosure provides a computer-readable medium for storing instructions for performing a method according to claim 20 on a data processor.

The terms "client unit," "connection unit," "pseudonymization unit" and "evaluation unit" are to be understood in the broadest sense and refer in particular in the claims, preferably in the description, in each case to a device, an apparatus, an entity, a machine, a resource or the like, which is designed to provide computer functions, for example in the form of a PC, a tablet, a cell phone, a server or the like, and which comprises one or more processors with one or more cores and which is connectable to a memory for storing one or more applications and which is designed to carry out corresponding steps of one or more embodiments of the present disclosure. Thereby, any application can be executed on a software-based and/or hardware-based basis and stored or installed in the memory with which the processor or processors operate. Thereby, the devices, entities, units or the like can be designed in such a manner that they perform the corresponding steps in an optimum manner. For example, various steps can be performed in parallel on a single processor on different cores. In addition, in particular the client unit and the connection unit can be implemented in a single data processor or device. The device or devices, entities, units or the like can also be instantiated as virtual machines on a single physical data processing unit or resource. Different devices can be correspondingly provided on the same physical data processing unit or resource. The device or devices entities, units or the like can have one or more interfaces for communicating with the environment, for example for communication with other devices, persons or the like.

The term "computer-readable medium" is to be understood in the broadest sense and refers in particular in the claims, preferably in the description, to any kind of medium which can be used together with a data processor or computer and on which information can be stored. Said information can be any kind of data that can be loaded into a memory from a computer or data processor. For example, said information can include computer programs for execution on a computer. Examples of computer-readable media are tapes, CD-ROMs, DVD-ROMs, DVD-RAMs, DVD-RWs, Blu-rays, DAT, mini-discs, solid state disks (SSD), floppy disks, SD cards, CF cards, memory sticks, USB sticks, EPROM, EEPROM or the like.

The term "partial data" is to be understood in the broadest sense and refers in particular in the claims, preferably in the description, to any kind of data, information or the like, which are part of a data set.

The term "secure connection" is to be understood in the broadest sense and refers in particular in the claims, preferably in the description, to any type of connection between two devices, units, data processing units or the like, which has a minimum of security against attacks on the data transmitted by way of the connection.

The term "login information" is to be understood in the broadest sense and refers in particular in the claims, preferably in the description, to any type of information, data or the like, which enable application, authentication, recording, access or the like to a device, an application on the device or components of the device.

The term "request" is to be understood in the broadest sense and refers in particular in the claims, preferably in the description, to a data packet, message, information packet or the like, which requests certain data, information, instructions, a reaction or the like from a device, an application on a device or components of a device.

The term "session information" is to be understood in the broadest sense and refers in particular in the claims, preferably in the description, to a data packet, message, information packet or the like, which comprises certain data or information regarding an existing connection between two devices, units or entities.

The term "certificate" is to be understood in the broadest sense and refers in particular in the claims, preferably in the description, to digitally existing data, information or a data record which confirms certain properties of persons, devices or general objects, such that its authenticity and integrity can be checked or verified, preferably by cryptography. In particular, a certificate contains the data required for its checking.

The term "collision-free" with respect to the term "hash," "hash function," "scattering value function," "hash algorithm" or the like refers to different output data provided in each case upon the input of different input data. In other words, a collision is present if the same hash value is assigned to different input values as the output value.

One of the advantages achieved with this is that a clear and secure evaluation by an external provider is made possible. At the same time, errors in the allocation are avoided by the assignment information which is generated by the connection unit. A further advantage is the high level of security, since data are transmitted from the connection unit via the evaluation unit for the client unit, but these are encrypted and thus cannot be read by the evaluation unit. A further advantage is that the first partial data, in particular the evaluated data and the second partial data, in particular in the form of personal data, are merged only locally in the network of the client unit and the connection unit and can thus be provided uniformly and in a user-friendly manner in the local network. In addition to the aforementioned high level of security, a high level of flexibility is also made possible, since transmission of data are possible independently of the provider of a local data management infrastructure. In addition, different evaluation modules can be implemented in a flexible manner on the evaluation unit.

Further features, advantages and preferred embodiments of the disclosure are described or disclosed below.

According to an advantageous embodiment, unique session information, in particular session information that is valid for a limited period of time, is generated by way of the connection unit and is checked for current status and/or authenticity before data are transmitted between the connection unit and the evaluation unit, wherein the data exchange does not take place in case of a negative check result. This substantially increases security in data transmission.

According to an additional advantageous embodiment, the session information is generated for a connection for data exchange between a client unit and the connection unit. This further increases security, since in particular only time-limited sessions between the client and the connection unit are enabled.

According to an additional advantageous embodiment, the connection unit for receiving data provides at least the evaluation unit with a public key of an asymmetric encryption method. In this manner, a secure connection between the evaluation unit and the connection unit can be provided.

According to an additional advantageous embodiment, the authenticity of the evaluation unit is checked on the basis of a security certificate. The authenticity of the evaluation unit can thus be checked in a simple and secure manner, for example by the connection unit or by a client unit.

According to an additional advantageous embodiment, the secure connection is provided on the basis of the TLS or SSL protocol. This enables a simple implementation and secure transmission of data via the secure connection.

According to an additional advantageous embodiment, a client unit requests in particular merged third and second partial data from the connection unit via a second secure connection between the client unit and the connection unit on the basis of first and second partial data in such a manner that the connection unit redirects the request to the evaluation unit via the secure connection, first partial data and pseudonymized second partial data are transmitted to the latter, third partial data and pseudonymized second partial data are received and made available to the client unit, and wherein second partial data associated with the third partial data are requested from the connection unit by way of the evaluation unit and transmitted to the client unit, wherein the merging of the third and second partial data take place on the client unit or the connection unit. One of the advantages achieved with this is that, for example, a request for evaluating data can take place via a unit connected to the connection unit, without the evaluation unit of such unit having to be known.

According to an additional advantageous embodiment, the second secure connection is provided for encryption on the basis of the encryption of the data in the form of a symmetrical key. This makes it possible to encrypt the connection between the client unit and the connection unit in a particularly simple and rapid manner.

According to an additional advantageous embodiment, the different partial data are provided in such a manner that the original data are divided into at least two partial data by the connection unit according to at least one predetermined rule. Thus, a reliable allocation of first and second partial data with simultaneous simple provision of the two partial data on the basis of the original data is possible.

According to an additional advantageous embodiment, the second partial data are pseudonymized by way of a collision-free hash method. This further increases security.

According to an additional advantageous embodiment, the second partial data are pseudonymized on the basis of local information of the connection unit, in particular comprising a static local key. Thus, for example, pseudonymized data of a patient or the like can be uniquely provided for each individual connection unit.

According to an additional advantageous embodiment, transmitted data are checked for completeness and correctness, in particular by way of a hash value of the transmitted data. Thus, security can be increased even further.

According to an additional advantageous embodiment, the third partial data are provided with a watermark. Such watermark can be inserted, for example, visibly or invisibly into the evaluated data. One of the advantages achieved with this is that it enables identification or authentication, for example by external evaluation providers.

According to an additional advantageous embodiment, the third partial data are merged by the connection unit or a client unit connected to the connection unit. An advantage of merging on the connection unit is a central provision of merged partial data for a plurality of client units. The advantage of merging on the client unit is that security is further increased, since the data are merged only locally.

According to an additional advantageous embodiment, the client unit is provided as a web browser on the connection unit. An advantage of this is a simple and simultaneously secure implementation.

According to an additional advantageous embodiment, the pseudonymization unit is provided on the connection unit or on the first network. In the first case, a rapid and reliable pseudonymization can thus be provided, whereas, in the second case, a uniform pseudonymization by the pseudonymization unit can take place centrally for a plurality of different client units and their partial data, which enables a simple implementation and a high level of security for a plurality of users, for example within the framework of a register study.

According to an additional advantageous embodiment, login information is transmitted from the connection unit to the evaluation unit for access to the latter by way of the secure connection and wherein, after successful verification of the login information by the evaluation unit, the transmission of the first partial data, the pseudonymized second partial data and the assignment information takes place. This ensures that data are only uploaded to the evaluation unit if the connection unit has authenticated itself on the basis of the login information.

According to an additional advantageous embodiment, connection-specific information, in particular session information, is added to the login information between the connection unit and a client unit. This further increases security, since such session information can also be checked by the evaluation unit.

Other important features and advantages of the disclosure result from the dependent claims, from the drawings, and from the associated description with reference to the drawings.

It is understood that the features mentioned above and the features yet to be explained below can be used not only in the respectively specified combination, but also in other combinations or on their own, without leaving the scope of the present disclosure.

Preferred designs and embodiments of the disclosure are shown in the drawings and are explained in more detail in the following description, wherein identical reference signs refer to identical or similar or functionally identical components or elements.

BRIEF DESCRIPTION OF THE SEVERAL VIEWS OF THE DRAWINGS

The following are shown in schematic form.

DETAILED DESCRIPTION

Figure 1:
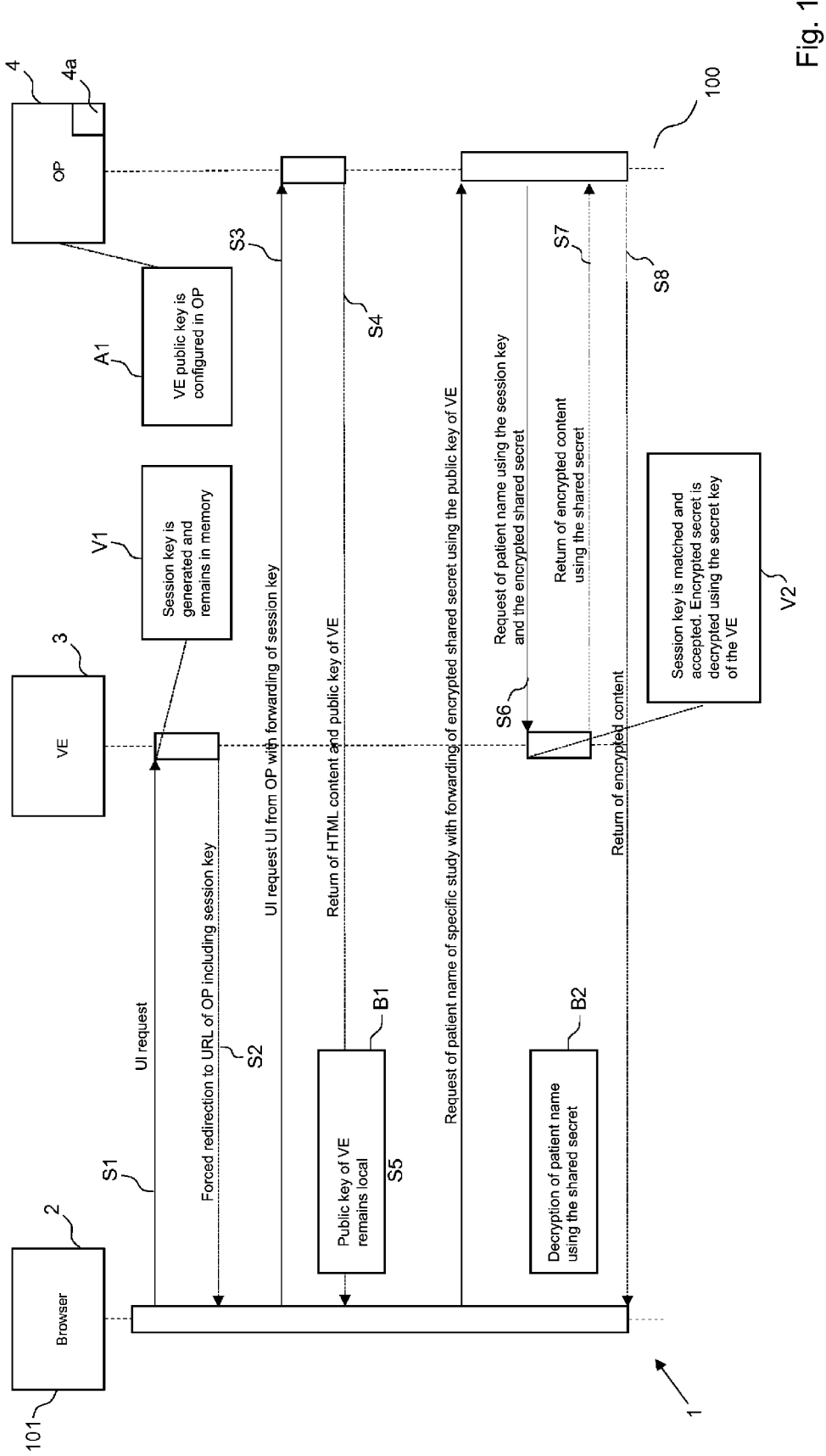
FIG. 1 shows steps of a method according to one embodiment of the present disclosure.

FIG. 1 shows steps of a method according to an embodiment of the present disclosure.

In detail, FIG. 1 shows a client unit in the form of a browser 1 connected to a connection unit 3 via an interface or the like. Via the connection unit 3, the browser 2 can access an online platform 4, for example a cloud server or the like. The connection unit 3 and the browser 2 are located in a local network of a practice or a clinic, whereas the online platform 4 is connected to the connection unit 3 via an Internet connection.

Thereby, the connection unit 3 and the online platform 4 communicate via a secured connection.

The connection unit 3 can have as hardware a central processor, a memory, along with communication interfaces, in particular in the form of a WLAN/LAN interface.

In FIG. 1, this also provides a local server application, comprising a DICOM node for receiving image data in the local network and for importing result data, a configuration mask in the form here of a web-based user interface—User Interface UI—for configuring the internal network address—IP address, proxy settings, and, if necessary, further functions, a local PID-DB database, on which the identifying patient data, for example, name, date of birth, etc., and the assignment to a pseudonym-patient identifier, PID—are managed, a pseudonymization unit for processing the patient data, a service for generating and managing session tokens, a service for establishing a connection and communication with the online platform, and in particular a backup service.

In the embodiment of FIG. 1, the online platform 4 provides user administration, management of the image data, and image processing, in particular preprocessing and quality analysis.

In addition, the online platform 4 can also provide a collaboration platform, which enables the "inviting" of other users for a case, such as other physicians or patients, and/or the commenting on a case by way of chat or query. Access to patients can also be provided.

In addition, a central pseudonymization service can also be provided on a pseudonymization unit for a plurality of centers, for example within the framework of a register study or the like. The pseudonymization unit can then be located in the local network, for example on the Internet. The pseudonymization unit returns corresponding pseudonymized data in particular upon receipt of plain data. In FIG. 1 and the following FIG. 2, the pseudonymization unit is formed as a local service of the connection unit 3 and is not designated by a separate reference sign.

In the embodiment of FIG. 1, for each practice or clinic using the connection unit 3, a user group is established and managed on the online platform 4. Each user receives personalized access data. The online platform 4 provides a closed area for the user group, which is accessible via the Internet. Image data and result data are accessible there, but patient data which are not identifiable are stored there. However, the identifying patient data, such as name and birth year, can be displayed in the same window of the browser 2 together with the image data, if the connection to the online platform 4 is established from the internal practice or clinical network 101. The process is shown in FIG. 1.

Each connection unit 3 is preferably precisely assigned to a user group, has a unique identification and has its own key pair with a private and a public key. The respective public key is also stored on the online platform 4 in the network 100. The connection unit 3 is connected in the local network 101 and offers, in particular on a configurable IP address, a service which, when called up with the aid of the web browser 2, generates a unique session token with time-limited validity.

The connection unit 3 then routes the connection of the web browser 2 to the online platform 4. The connection between connection unit 3 and online platform 4 is protected by way of an SSL certificate, which ensures the authenticity of the online platform 4 and encrypts the further communication. In addition, the generated session token is transmitted to the online platform 4, where it is linked to the online platform session of the user. In the Internet browser 2, the user now logs in with his personal access data on the online platform 4. The connection unit 3 of the associated user group establishes a connection to the online platform 4. In this and any further requested data exchange between the online platform 4 and the connection unit 3 in the same session, there is a check of whether the connection unit 3 issued the token/session character session and whether the session is still current. If this is the case, the data exchange is permitted. The public key of the connection unit 3 is sent to the browser 2. An additional "internal key" for symmetrical encryption is generated locally in the browser 2, in particular randomly, in order to save the identifying data in the communication between the connection unit 3 and the browser 2. This is encrypted with the aid of the public key of the connection unit 3 and is transmitted via the online platform 4 to the connection unit 3.

Such message can be read on the connection unit 3 by way of the associated private key. Thus, the internal key for symmetric encryption is known only to the browser 2 and the connection unit 3. All following requests relating to identifiable patient information are secured with such key, the internal key.

If a user now requests patient data identifying them in a view, such data are encrypted with the internal key on the connection unit 3, sent via the online platform 4 to the browser 2 by way of the SSL secured connection, and decoded there again in the local browser 2. Result data and medical data, such as image data managed on the online platform 4, can be sent directly from the online platform 4 to the browser 2. The information is displayed there in the same browser window, secured with a valid certificate of the online platform 4, and without the online platform 4 having access to the identifying patient data.

Thus, if the browser 2 makes a request to merge data, such data are transmitted from the browser 2 to the connection unit 3 in a first step S1. The connection unit 3 generates and stores a session key in a step V1.

In a further step S2, the connection unit 3 forwards the request to the online platform 4 via the browser 2 and in a further step S3 together with the session character via a secured connection. Both image data and a public key of the connection unit 3 which is stored there in a step A1 are stored in the online platform 4. The online platform 4 now provides the corresponding image data together with the public key of the connection unit 3 to the browser 2 in a further step S4. In a step B1, the public key of the connection unit 3 is stored in the local network 101. If a user now requests identifying patient data via the browser 2 in a step S5, such request is forwarded from the online platform 4 to the connection unit 3 in a step S6. This checks the session character in a step V2.

Furthermore, the private key of the connection unit 3 decrypts the internal key. Subsequently, the identifying patient data are encrypted with the internal key of the connection unit 3 and sent to the online platform 4 in a step S7. In a step S8, such encrypted identifying patient data are transmitted to the browser 2, which in a step B2 decrypts the identifying patient data by way of the internal key. The image data together with the identifying patient data can be displayed to a user.

In an additional embodiment, the disclosure provides a method for merging different partial data, in particular in the form of evaluation data and personal data as first and second partial data, which are stored in different networks 100, 101, wherein the different partial data are assignable to one another by way of assignment information, comprising the steps of:

providing a secure connection between a connection unit 3 in a first network 101 and an evaluation unit 4 in a second network 100 and between a client unit 2, in particular in the form of a web browser on the connection unit 3, in a first network 101 and an evaluation unit 4 in a second network 100;

transmitting login information provided by a client unit 2 in the first network 101 to the evaluation unit 4 via the secure connection, wherein the connection unit 3 adds connection-specific information of the connection between the client unit 2 and the connection unit 3 to the login information;

after the successful checking of the login information by the evaluation unit 4, transmitting first partial data stored on the evaluation unit 4 from the evaluation unit 4 to the client unit 2 together with first encryption information of the connection unit 3 for communication with the evaluation unit 4;

sending a request for providing the second partial data by way of the client unit 2 to the evaluation unit 4 comprising encryption information for the connection between the client unit 2 and the connection unit 3, wherein the request is encrypted by way of the first encryption information of the connection unit 3;

forwarding the encrypted request from the evaluation unit 4 to the connection unit 3;

decrypting the encrypted request by the connection unit 3 by way of the first encryption information and providing the requested second partial data;

encrypting the second partial data by way of second encryption information for the connection between the client unit 2 and the connection unit 3;

transmitting the encrypted second partial data from the connection unit 3 via the evaluation unit 4 to the client unit 2 by way of the secure connection;

decrypting the second partial data by way of the second encryption information for the connection between the client unit 2 and the connection unit 3 by the client unit 2; and assigning the first partial data and the second partial data on the client unit 2 on the basis of the assignment information.

This additional embodiment is based, for example, on the embodiment of FIG. 1.

Figure 2:
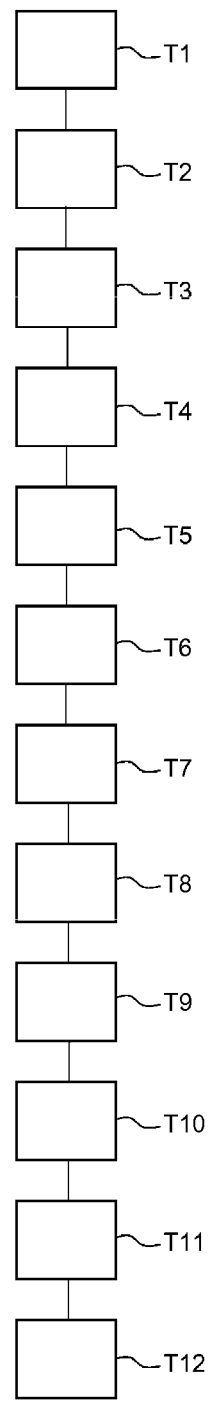
FIG. 2 shows steps of a method according to one embodiment of the present disclosure.

FIG. 2 shows steps of a method according to an embodiment of the present disclosure.

In detail, FIG. 2 shows steps of a method for requesting a quantitative image data evaluation by an examining physician.

In a first step T1, a patient is examined in a magnetic resonance scanner. The image data obtained are stored in the "DICOM" format on the device and/or the local PACS system. Any other form or type of examination is conceivable, as is any other type of data, for example audio data or the like.

Here, the abbreviation "DICOM" stands for digital imaging and communications in medicine, that is, for digital imaging and communication in medicine, and the abbreviation "PACS" stand for picture archiving and communication system, that is to say for an image storage and communication system.

In a third step T3, the DICOM receiving node of the connection unit 3 receives the DICOM data and stores them temporarily in an input memory. Thereby, the files of an examination, for example a study, can be merged as a data record. A defined interface is used to determine whether the data of a patient has already been stored in the local PID-DB database for the assignment of identifying patient data and PID-DB pseudonyms. Such a matching is carried out on the basis of a plurality of identifying features of the patient, such as patient name, birthday and/or sex. If the matching is negative, a new pseudonym is generated automatically by applying a maximum collision-free hash algorithm to the identifying features, and storing it with the name in the local PID-DB database. If yes, the associated pseudonym is read from the local PID-DB database.

A static local key which is uniquely assigned to each connection unit 3 can be used in the hash calculation. Thereby, the patient identification information PID of a patient is unique for each connection unit 3.

In an additional embodiment, the PID-DB database can be located in an external device in the internal or a virtual private network, such that all connection units 3 can access the same PID-DB database.

In an additional embodiment, the PID-DB database is located on an external server on the Internet, but returns no plain data. Thus, for example, multiple clinics/practices can obtain the same patient identification information PID for a patient, which may be required, for example, in register studies.

In an additional embodiment, it is possible that a predetermined pseudonym is entered manually into the PID-DB database.

At a fourth step T4, the DICOM data are pseudonymized by the connection unit 3. In particular, the patient name is replaced by a pseudonym and all personal data are deleted from the DICOM tags.

In an additional embodiment, text recognition software can be used to identify and remove patient names, etc., that may be present in the image, and/or image analysis software can be used to automatically remove identifying features such as facial features in head images. Each of the de-identified files is ready for transmission in a working memory of the connection unit 3.

In an additional embodiment, the data are compressed on connection unit 3 in order to achieve faster transmission for low bandwidth Internet connections.

In a fifth step T5, the connection unit 3 opens an encrypted connection to the online platform 4 on the Internet and checks the authenticity of the remote station, that is, the online platform 4, on the basis of the SSL certificate used. The connection unit 3 authenticates itself to the online platform 4 by way of a certificate. The de-identified image data are transmitted for example by way of the HTTPS protocol. The successful transmission is checked on the basis of the check of an MD5 hash of the files. The temporarily stored data in the input memory of the connection unit 3 are deleted. The time of transmission can be configured such that an immediate transmission or a daily transmission is possible, for example at night, with otherwise low utilization of the Internet connection or the like.

In a sixth step T6, the data in the database system of the online platform 4 are assigned to the user group of the connection unit 3 and stored. In the present embodiment, each connection unit 3 is assigned to exactly one user group. The data are automatically checked for contents. Thereby, DICOM metadata, for example, are detected. The data can be analyzed by way of a data processing unit 4a on the online platform 4. The analysis results are stored in the database on the online platform 4. On the basis of the results, the online platform 4 determines, by matching with an application database, which evaluation modules can be used with the image data. In an additional embodiment, it can be configured that a specific evaluation is carried out automatically after successful testing, for example the volume determination of the brain.

In a seventh step T7, a user accesses the service provided by the connection unit 3 by way of a web browser 2 in the internal network 101 and is forwarded to the web interface of the online platform 4 via a secured connection to the online platform 4, as described above. The user can log in with a user account. The connection unit 3 and the online platform 4 establish a secure SSL connection and link the pseudonymized image data and analysis results stored on the online platform 4 with the plain data stored and encrypted on the connection unit 3. Both data, that is, pseudonymized image data together with analysis results and plain data, are jointly presented to the user in the same browser window. Here, such linking and the decryption of the plain data takes place locally in the browser 2.

In an eighth step T8, the user selects the data record for which he wishes to start an evaluation. The user interface UI can indicate to the user which evaluations can be performed. The user then selects an evaluation. If further user interactions are required, in this case a user can carry out inputs in a further step T9 and, for example, record areas on displayed images which are to be explicitly taken into account by the application or excluded from the evaluation.

At a tenth step T10, the online platform 4 automatically executes the evaluation. The evaluation application is preferably executed within a closed analysis network; the pseudonymized image data does not leave such protected network. The result data are stored in the database of the online platform 4. The result data can include derived image data present in DICOM format, or text data, tables and reports. In the configuration of the application, whether these result data are to be transmitted back to the PACS of the practice or clinic can be specified.

The connection unit 3 then requests result data from the online platform 4 in an eleventh step T11. If the result data are in DICOM format and are to be transmitted back into the PACS of the practice or clinic, they are retrieved by the connection unit 3 as soon as they are present, and are stored there in an input memory. The connection unit 3 reads from the PID-DB database the patient name matching the patient identification information PID. The PID is replaced with the patient name, and further defined identifying data are supplemented such that it is automatically assigned to the same patient again in PACS. The connection unit 3 sends the DICOM data to the local PACS and deletes the data in the input memory.

If the result data are available in the form of a report, for example in PDF format, and it is provided that they are printed out or managed locally outside the PACS, the patient identification information PID can be replaced by the patient's plain data. In this case, reports provided with plain names can be kept locally on the connection unit 3 and managed via the user interface.

At a twelfth step T12, the user can view the result data directly in PACS. The user can access the data along with the intermediate results and the progress of the overall evaluation process in the user interface UI, which is in particular browser-based.

The user can access the data along with the intermediate results and the progress of the overall evaluation process without patient names after login on the online platform 4 on the Internet, for example via browser or app. Depending on the application and implementation, the user can make entries in the user interface in order to optimize and repeat the evaluation. For example, it can record areas on displayed images, which are to be explicitly taken into account by the application or excluded from the evaluation.

In an additional embodiment, the result data can be provided with a watermark that is removed only once the user accepts the results.

In an additional embodiment, the user can view, manage and print automatically generated areas or the like in a private area of the user interface.

In an additional embodiment, the user can release individual visits or data from patients so that a patient himself or another physician can access them.

Preferably, encrypted fuses can be performed on a storage medium located in the local network. It is also possible to secure the data encrypted with the aid of the public key of the connection unit 3 in a memory of the online platform 4.

In summary, at least one of the embodiments of the disclosure has at least one of the following advantages:
- simple implementation;
- cost-effective implementation;
- high level of security; and
- high level of flexibility.

In other words, at least one of the embodiments of the disclosure shows a method and a system which makes it possible to transmit medical patient data in an automatic and non-identifiable manner from the internal network of a practice or clinic to a software platform on the Internet, to manage it there and to perform evaluation modules available there to support diagnostics. The transmission is possible independently of the provider of the local data management infrastructure, since established interface parts can be used as standards. Evaluation modules can be placed on the online platform by third-party providers and results of the evaluations can be automatically transmitted back into the internal network. The patient names can then be assigned to the result data in the internal network. A user interface can represent the allocation of the patient data and the medical data in the internal network. The identifiable patient data are thereby managed locally in particular. The medical data are preferably medical image data, for example MRT, CT or the like, but also data rows such as ECG or recordings of "wearables" which communicate via a secured connection. The result data present in the online platform, along with image data and the identifying patient features managed only locally, can then be merged and displayed uniformly, in a user-friendly manner and via an encrypted connection in a web interface via any web browser.

Although the present disclosure was described with reference to preferred exemplary embodiments, it is not limited thereto but modifiable in a variety of ways.

LIST OF REFERENCE SIGNS

1 System
2 Client unit
3 Connection unit
4 Evaluation unit
4a Data processing unit
100, 101 Network The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for merging different partial data, comprising the steps of:
providing a secure connection between a connection unit in a first network and an evaluation unit in a second network;
separating original data into at least two partial data comprised of evaluation data and personal data as first and second partial data, wherein the different partial data are assignable to one another by way of assignment information:
pseudonymizing the second partial data by way of a pseudonymization unit;
transmitting the first partial data and the pseudonymized second partial data and the assignment information from the connection unit to the evaluation unit;
storing the second partial data on the connection unit;
providing third partial data on the evaluation unit on the basis of the first partial data, wherein the third partial data are provided in the form of evaluated first partial data;
transmitting the third partial data and the pseudonymized second partial data together with the assignment information to the connection unit via the secure connection by the evaluation unit: and
merging the third partial data and the second partial data on the basis of the assignment information.

2. The method according to claim 1, wherein unique session information that is valid for a limited period of time is generated by way of the connection unit and is checked for current status and/or authenticity before data are transmitted between the connection unit and the evaluation unit, wherein the data transmission does not take place in case of a negative check result.

3. The method according to claim 2, wherein the session information is generated for a connection for data exchange between a client unit and the connection unit.

4. The method according to claim 1, wherein the connection unit for receiving data at least of the evaluation unit provides a public key of an asymmetric encryption method.

5. The method according to claim 1, wherein authenticity of the evaluation unit is checked on the basis of a security certificate.

6. The method according to claim 1, wherein the secure connection is provided by way of a TLS or SSL protocol.

7. The method according to claim 1, wherein a client unit requests the merged third and second partial data from the connection unit via a second secure connection between the client unit and the connection unit on the basis of the first and second partial data, in such a manner that the connection unit redirects the request to the evaluation unit via the secure connection, wherein the first partial data and the pseudonymized second partial data are transmitted to the evaluation unit, the third partial data and the pseudonymized second partial data are received by the connection unit and made available to the client unit, and wherein the second partial data associated with the third partial data are requested from the connection unit by way of the evaluation unit and transmitted to the client unit, wherein the merging of the third and second partial data takes place on the client unit or the connection unit.

8. The method according to claim 7, wherein the second secure connection is provided for encryption on the basis of the encryption of the data in the form of a symmetrical key.

9. The method according to claim 1, wherein the different partial data are provided in such a manner that the original data are divided into the at least two partial data by the connection unit according to at least one predetermined rule.

10. The method according to claim 1, wherein the second partial data are pseudonymized by way of a collision-free hash method.

11. The method according to claim 1, wherein the second partial data are pseudonymized on the basis of local information of the connection unit comprising a static local key.

12. The method according to claim 1, wherein transmitted data are checked for completeness and correctness by way of a hash value of the transmitted data.

13. The method according to claim 1, wherein the third partial data are provided with a watermark.

14. The method according to claim 1, wherein the third partial data and the second partial data are merged by the connection unit or a client unit connected to the connection unit.

15. The method according to claim 14, wherein the client unit is provided as a web browser on the connection unit.

16. The method according to claim 1, wherein the pseudonymization unit is provided on the connection unit or on the first network.

17. The method according to claim 1, wherein login information is transmitted from the connection unit to the evaluation unit for access to the evaluation unit by way of the secure connection and wherein, after successful verification of the login information by the evaluation unit, the transmission of the first partial data, the pseudonymized second partial data, and the assignment information takes place.

18. The method according to claim 17, wherein connection-specific information is added to the login information between the connection unit and a client unit.

19. A connection unit for handling data when carrying out a method according to claim 1, designed to carry out the steps of:
providing the secure connection to the evaluation unit in the second network;
transmitting the first partial data and the pseudonymized second partial data to the evaluation unit;
storing the second partial data on the connection unit;
receiving the third partial data and the pseudonymized second partial data together with the assignment information via the secure connection from the evaluation unit; and
merging the third partial data and the second partial data on the basis of the assignment information.

20. A method for handling data on a connection unit according to claim 19, comprising the steps of:
providing the secure connection to the evaluation unit in the second network:
transmitting the first partial data and the pseudonymized second partial data to the evaluation unit;
storing the second partial data on the connection unit;
receiving the third partial data and the pseudonymized second partial data together with the assignment information via the secure connection from the evaluation unit; and
merging the third partial data and the second partial data on the basis of the assignment information.

21. An evaluation unit for carrying out a method according to claim 1, designed to carry out the steps of:
providing the secure connection to the connection unit in the first network;
receiving the first partial data and the pseudonymized second partial data together with the assignment information from the connection unit;
providing the third partial data based on the first partial data, wherein the third partial data are provided in the form of evaluated first partial data; and
transmitting the third partial data and the pseudonymized second partial data together with the assignment information to the connection unit via the secure connection.

22. A client unit for carrying out a method according to claim 7, designed to request the merged third and second partial data from the connection unit via the second secure connection to the connection unit on the basis of the first and second partial data, in such a manner that the second partial data associated with the third partial data are transmitted from the connection unit via the evaluation unit to the client unit, wherein the client unit merges the third and second partial data.

23. A system for merging different partial data in the form of evaluation data and personal data, as partial data which are stored in different networks, wherein the different partial data are assignable to one another by way of assignment information, comprising:
at least one connection unit for handling data when carrying out a method according to claim 1, designed to carry out the steps of:
providing the secure connection to the evaluation unit in the second network;
transmitting the first partial data and the pseudonymized second partial data to the evaluation unit;
storing the second partial data on the connection unit;
receiving the third partial data and the pseudonymized second partial data together with the assignment information via the secure connection from the evaluation unit; and
merging the third partial data and the second partial data on the basis of the assignment information; and
an evaluation unit for carrying out a method according to claim 1, designed to carry out the steps of:
providing the secure connection to the connection unit in the first network;
receiving the first partial data and the pseudonymized second partial data together with the assignment information from the connection unit;
providing the third partial data based on the first partial data, wherein the third partial data are provided in the form of evaluated first partial data; and
transmitting the third partial data and the pseudonymized second partial data together with the assignment information to the connection unit via the secure connection.

24. A non-transitory computer-readable medium for storing computer-executable instructions that, when executed by a data processor, cause the data processor to carry out a method according to claim 1.

25. A non-transitory computer-readable medium for storing computer-executable instructions that, when executed by a data processor, cause the data processor to carry out a method according to claim 20.

* * * * *